United States Patent
Jans

(10) Patent No.: US 11,732,766 B2
(45) Date of Patent: Aug. 22, 2023

(54) METHOD FOR DETERMINING A KISS POINT OF A CLUTCH

(71) Applicant: Punch Powertrain PSA e-transmissions NV, Sint-Truiden (BE)

(72) Inventor: Casper Herman Jans, Sint-Truiden (BE)

(73) Assignee: PUNCH POWERTRAIN PSA E-TRANSMISSIONS NV, Sint-Truiden (BE)

( * ) Notice: Subject to any disclaimer, the term of this patent is extended or adjusted under 35 U.S.C. 154(b) by 0 days.

(21) Appl. No.: 17/793,689

(22) PCT Filed: Feb. 18, 2021

(86) PCT No.: PCT/EP2021/054031
§ 371 (c)(1),
(2) Date: Jul. 19, 2022

(87) PCT Pub. No.: WO2021/165398
PCT Pub. Date: Aug. 26, 2021

(65) Prior Publication Data
US 2023/0047752 A1    Feb. 16, 2023

(30) Foreign Application Priority Data
Feb. 18, 2020   (BE) .................... 2020/5105

(51) Int. Cl.
*F16D 48/06*    (2006.01)
*F16D 48/02*    (2006.01)

(52) U.S. Cl.
CPC .......... *F16D 48/066* (2013.01); *F16D 48/02* (2013.01); *F16D 2048/0245* (2013.01);
(Continued)

(58) Field of Classification Search
None
See application file for complete search history.

(56) References Cited

U.S. PATENT DOCUMENTS 5,853,076 A     12/1998  McKee et al.
2017/0321765 A1*  11/2017  Ruiters ................... F16D 48/02

FOREIGN PATENT DOCUMENTS

DE         10244393 A1    4/2004
DE      102006045573 A1    4/2008
(Continued)

OTHER PUBLICATIONS

Search Report dated Apr. 13, 2021, issued in corresponding International Application No. PCT/EP2021/054031 (5 pgs.).
(Continued)

*Primary Examiner* — Timothy Hannon
(74) *Attorney, Agent, or Firm* — Pillsbury Winthrop Shaw Pittman, LLP

(57) ABSTRACT

Method for determining a kisspoint of a clutch. A method is provided of determining a kisspoint of a clutch in a driveline of a vehicle comprising a. increasing a target clutch pressure of a clutch piston up to a first predetermined test target pressure, b. increasing the target clutch pressure up to an upper target pressure and subsequently keeping the target clutch pressure stable for a predetermined time interval, c. monitoring a parameter indicative for the filling of the clutch piston, e.g. the rotational speed of a pump, during the predetermined time interval, d. repeating steps a., b., and c. for at least one further predetermined test target pressure, and e. determining the kisspoint based on the monitored parameter indicative for the filling of the clutch piston.

10 Claims, 3 Drawing Sheets

(52) U.S. Cl.
CPC ........ *F16D 2500/1026* (2013.01); *F16D 2500/10412* (2013.01); *F16D 2500/3166* (2013.01); *F16D 2500/50275* (2013.01); *F16D 2500/70406* (2013.01)

(56) References Cited

FOREIGN PATENT DOCUMENTS

| DE | 102006045574 A1 | 4/2008 |
| --- | --- | --- |
| DE | 102009053693 A1 | 5/2011 |
| DE | 102010039172 A1 | 2/2012 |
| DE | 102015109600 B3 | 11/2016 |

OTHER PUBLICATIONS

Written Opinion of the International Searching Authority dated Apr. 13, 2021, issued in corresponding International Application No. PCT/EP2021/054031 (7 pgs.).

\* cited by examiner

METHOD FOR DETERMINING A KISS POINT OF A CLUTCH

CROSS-REFERENCE TO RELATED APPLICATIONS

This is the U.S. National Stage of PCT/EP2021/054031, filed Feb. 18, 2021, which claims priority to Belgium Patent Application No. BE2020/5105, filed Feb. 18, 2020, and all contents of each of these applications are incorporated herein by reference in their entireties.

FIELD OF THE INVENTION

The present invention relates to a method for determining a kiss point of a clutch.

BACKGROUND

During the lifetime of a clutch, the pressure at which the clutch plates just engage changes, for example due to wear. This pressure is known in the art as the kisspoint of the clutch. Also, part to part variations cause the kisspoint pressure not to be equal between clutch samples.

The kisspoint may be used by a clutch control system which engages the clutch when e.g. the accelerator of a vehicle is depressed, and disengages the clutch when changing gears and when the vehicle comes to a standstill. When the kiss point used by the controller differs from the actual kiss point, this may negatively impact the driving experience of the vehicle as for example shocks may be felt by the driver of the vehicle.

Methods for estimating the kiss point are known, for example, by using the torque estimation of a torque source (e.g. ICE/EM torque), using the acceleration of a free transmission part, by breaking loose a gear synchronizer or by using the measured clutch pressure response. Use of torque estimation can be often inaccurate and unreliable. In some methods, a torque signal from a different part of the driveline is used, requiring the torque signal to be tuned for use in the kiss point determination. Also, a disadvantage of the known methods however, is that they often require an additional pressure sensor and/or that they are not sufficiently accurate and/or that they are not reliable over the whole lifetime of the clutch.

SUMMARY

There is a need for more accurately and/or more robust and/or more cost effectively determine the kiss point of a clutch.

Thereto, there is provided a method for determining the kiss point of a clutch for a more accurate and/or comfortable control of a clutch.

As such, a method of determining a kiss point, for example a torque kiss point or a volumetric kiss point, of a clutch in a driveline of a vehicle is provided comprising: a. increasing a target clutch pressure of a clutch piston up to a first predetermined test target pressure, b. increasing the target clutch pressure to an upper target pressure and subsequently keeping the target clutch pressure stable for a predetermined time interval, c. monitoring a parameter indicative for the filling of the clutch piston during the predetermined time interval, d. repeating steps a., b., and c. for at least one further predetermined test target pressure, and e. determining the kiss point based on the monitored parameter indicative for the filling of the clutch piston.

By using a parameter indicative for the filling of the clutch piston, a, relatively expensive, pressure sensor can be obviated, nor are torque signals required. As such, in a more cost effective manner, a more robust determination of the kiss point can be obtained. The kiss point is theoretically considered to be the point at which the clutch plates start contacting and the clutch starts to transfer torque. In practice however, the kiss point is not a sharp transition point, and is subject to change during lifetime of the clutch, due to various circumstances, such as wear. Since an accurate kiss point, as close as possible to the theoretical one, is important for the control of the clutch, and hence for the driver's experience, a robust method for determining the kiss point is sought. By iteratively increasing the test target pressure and monitoring the said parameter, the kiss point can be determined in an accurate manner. Also any adaption of the kiss point during the life time of the clutch can be noticed and determined.

During the increasing to a test target pressure, a volumetric and/or torque kiss point may or may not be reached. This may for example depend on the particular test target pressure and the state of the clutch, which state may change over the course of the lifetime of the clutch, for example due to wear. A definition of the volumetric kiss point is provided in conjunction with FIG. 1C.

If the kiss point is not reached during a first phase of increasing the target clutch pressure up to the test target pressure, during a second phase of increasing the clutch piston pressure to the upper target level pressure extra volume of fluid is supplied to the clutch piston. The fact that extra volume of fluid has been supplied to the clutch piston can be determined from the parameter indicative of the filling of the clutch piston.

If the kiss point has indeed been reached during the first phase while or after the test target pressure is reached, during the second phase no or substantially no additional fluid can be supplied to the clutch piston because the clutch plates have made contact and cannot be moved more towards each other.

It has been found that the test target pressure in which during this second phase no or substantially no fluid is supplied to the clutch piston is a candidate pressure for being, or being close to, the kisspoint. Thus, the kiss point may be determined as the test target pressure at which the monitored parameter indicative for the filling of the clutch piston is indicative of no or substantially no filling of the clutch piston.

In examples, the parameter indicative of the filling of the clutch piston may be a rotational speed of a motor connected to a pump supplying fluid to the clutch piston, a power supplied to this motor, a torque of the motor, a flow rate of the pump, a flow rate of fluid through a particular conduit, for example a conduit between the pump and the clutch piston, the flow of a flow regulating valve, a pressure drop over a known restriction, or any other parameter indicative of a displacement or moving rate of the clutch piston, and/or any other parameter related to the filling of the clutch piston, or any combination thereof.

The target pressure is not necessarily the actual pressure in the clutch piston, but may rather alternatively be a set point used in a controller controlling the pressure in the clutch piston. As such, the actual pressure may deviate from the target pressure for example because of part to part deviations and/or wear.

When the rotational speed of the pump motor is the parameter indicative for the filling of the clutch piston, this rotational speed may be integrated during at least part of the predetermined time interval to find the total pumped volume of fluid during the second phase of increasing the target clutch pressure to the upper target pressure and subsequently keeping the target clutch pressure stable for a predetermined time interval.

Furthermore, when the rotational speed of the motor is the parameter indicative for the filling of the clutch piston, no torque or pressure sensors are required for determining the kisspoint, which may reduce costs of the clutch actuation system.

The first test target pressure may be predetermined based on a previously determined kisspoint. For example, this previously determined kisspoint was determined during at an earlier time in the life cycle of the clutch. A predetermined value may be added or subtracted to the previously determined kiss point to obtain a new first predetermined test target pressure.

When for multiple test target pressures the monitored parameter indicative for the filling of the clutch piston is substantially equal, the kisspoint may be determined as the lowest test target pressure of these multiple test target pressures.

If the test target pressures do not correspond to a kisspoint of the clutch, the method steps a., b. and c. may be repeated for further test target pressures until a kisspoint has been found. As such, the number of test target pressure may not be a fixed number, but may indeed depend on the found parameter indicative for the filling of the clutch piston during the predetermined time interval.

In examples, the method may further comprise, prior to step a., determining whether other components of the vehicle require pressure from a pressure source used for increasing the target clutch pressure, and commencing with step a. only after determining that no other component requires pressure from this pressure source. If other components of the vehicle also require pressure from this pressure source, the determining of the kisspoint of the clutch may be disturbed, which may lead to inaccurate results.

Examples of the method may further comprise determining clutch life cycle data comprising data indicative of at least one of a mileage of the vehicle, a number of clutch engagement actions, and an amount of clutch usage time. Based on the clutch life cycle data, a moment in time may be determined at which step a. and subsequent steps in the method should be started.

For example, the kisspoint may be determined once every 1000 km driven by the vehicle, or any other distance, every 1000 clutch engagement actions, or any other number of clutch engagement actions, or every 100 hours of using the clutch, or any amount of time of using the clutch, or any combination thereof.

Once a kisspoint has been determined, the kisspoint may be adapted based on at least part of the clutch life cycle data. For example, after a predetermined interval of any of the parameters, for example after a predetermined amount of time, the kisspoint may be readjusted.

If multiple previous kisspoints are known, using the clutch life cycle data, the current kisspoint may be estimated or predicted. For example, from the difference between previously determined kisspoints and the corresponding change in clutch life cycle data, a relation between the kisspoint and at least part of the clutch life cycle data may be determined. Using this relation, the current kisspoint may be estimated using the current clutch life cycle data. This relation may be linear, but using more than two previous kisspoints, also a non-linear relation may be determined. The relation may be updated as well when a new kisspoint has been determined.

BRIEF DESCRIPTION OF THE FIGURES

In the figures.

In the figures, the same or corresponding elements are designated with the same or corresponding reference signs.

DETAILED DESCRIPTION OF THE FIGURES

The figures are given by way of exemplary embodiments of the disclosure only.

Figure 1A:
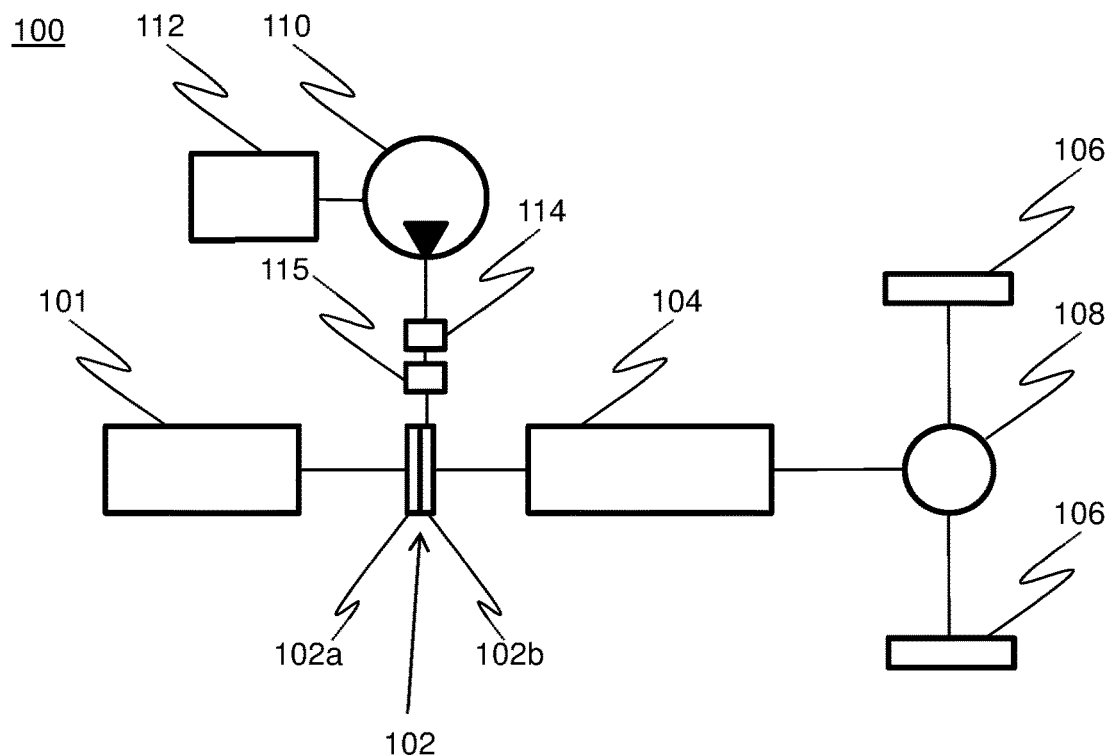
FIG. 1A depicts a schematic representation of a driveline of a vehicle.

FIG. 1A depicts a schematic representation of a driveline 100 of a vehicle, comprising an internal combustion engine 101 as an example of a torque source. In other examples, the torque source may be an electric motor, any other torque source, or any combination thereof.

Rotationally connected to the engine 101 is a first clutch plate 102a, arranged to engage with a second clutch plate 102b, the first clutch plate 102a and the second clutch plate 102b being comprised by a clutch 102. The driveline 100 further comprises an optional gear set 104, and an optional set of wheels 106 rotationally connected to the gear set 104 via an optional differential 108.

For pressing the second clutch plate 102b towards the first clutch plate 102a, the driveline 100 comprises an hydraulic fluid pump 110 driven by an electric motor 112. The hydraulic fluid pump 110 is provided in fluid connection with a clutch piston 115 via a clutch valve 114. Using the clutch valve 114, the clutch pressure on the clutch piston 115 can be controlled.

For controlling the electric motor 112, a motor controller (not shown) is provided. With the motor controller, the rotational speed, torque and/or power of the electric motor can be controlled. Also, the rotational speed of the electric motor 112 may be determined with the motor controller, a further rotational speed sensor, any other sensor, or a combination thereof. With the control of the motor 112, the fluid pressure provided to the clutch valve 114 can be controlled.

When the first clutch plate 102a and the second clutch plate 102b are fully engaged, rotational energy may be transferred between the engine 101 and the gear set 104. When the wheels 106 are coupled to the gear set 104, the engine 101 is now also coupled to the wheels 106 by virtue of the engaged first clutch plate 102a and second clutch plate 102b and the vehicle can be driven.

If the pressure on the clutch piston 115 is below a lower threshold, the clutch 102 is in a disengaged state. Thus, for safety reasons, a pressure is required for engaging the clutch 102. When the pressure is released, either willingly or unwillingly, the clutch 102 becomes disengaged. As such, the second clutch plate 102b may be biased away from the first clutch plate 102, for example by one or more springs.

Two different definitions of a kiss point are used in this description: 1) torque kiss point and 2) volumetric kiss point. The first one will be elaborated on in conjunction with FIG. 1B; the latter one will be elaborated on in conjunction with FIG. 1C.

Figure 1B:
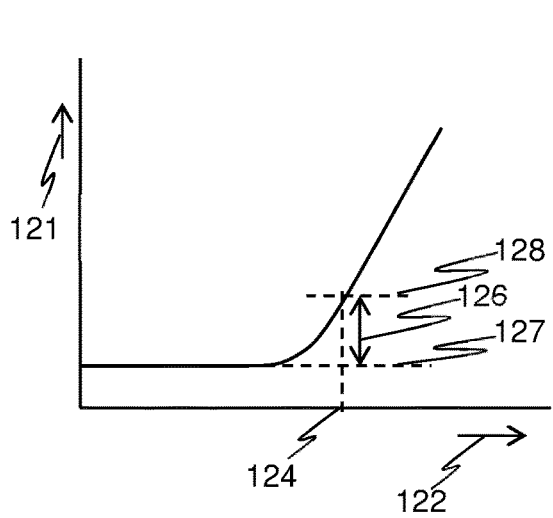
FIG. 1B depicts a schematic plot indicating a definition of a torque kiss point.

FIG. 1B depicts a schematic plot, in which on the vertical axis 121 a torque is plotted against a pressure on the horizontal axis 122. In particular, the pressure is the clutch piston pressure which may for example be expressed in Bar, and the torque is a torque transferable between the first clutch plate 102a and the second clutch plate 102b.

A base-line torque 127 may be zero or above zero, and defines the transferred torque with substantially no clutch pressure. As the clutch piston pressure rises, at a particular pressure indicated with reference numeral 124, the torque transferred has a particular value 128 which is a particular threshold value 126 higher than the base-line torque 127. For example, the threshold value 126 may be 5 Nm, 10 Nm, 20 Nm, or any other predetermined torque value. In this example, the pressure indicated with reference numeral 124 is the torque kiss point 124, which corresponds to the torque value 128. Torque value 128 corresponds to the sum of the base-line torque 127 and the threshold value 126.

Figure 1C:
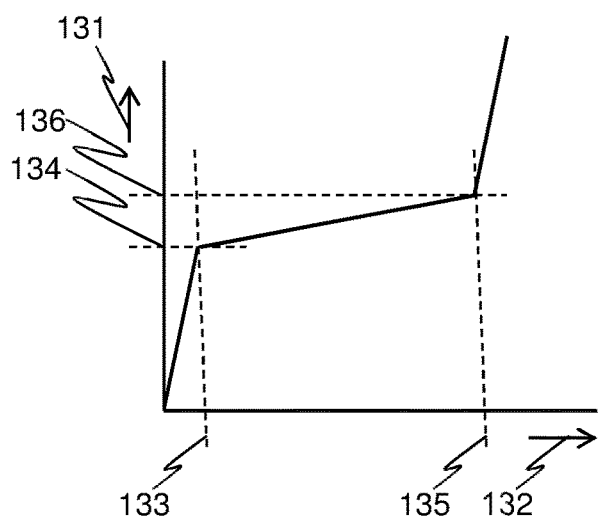
FIG. 1C depicts a schematic plot indication a definition of a volumetric kiss point.

FIG. 1C depicts a schematic plot, in which on the vertical axis 131 a pressure is plotted against a displacement on the horizontal axis 132. In particular, the pressure is the clutch piston pressure which may for example be expressed in Bar, and the displacement is a clutch piston displacement, which may be expressed in metres.

At a first displacement 133 of the clutch piston, a pre-load pressure 134 is achieved on the clutch piston, which may for example depend on a biasing force biasing the second clutch plate 102b away from the first clutch plate 102a in examples in which a biasing force is present.

At a second displacement 135, a so-called volumetric kiss point pressure 136 is achieved. The volumetric kiss point pressure 136 may be defined as the pressure at which the clutch piston is completely or substantially completely filled and the clutch piston starts to exert an axial force pressing the two clutch plates 102a, 102b together.

Figure 2A:
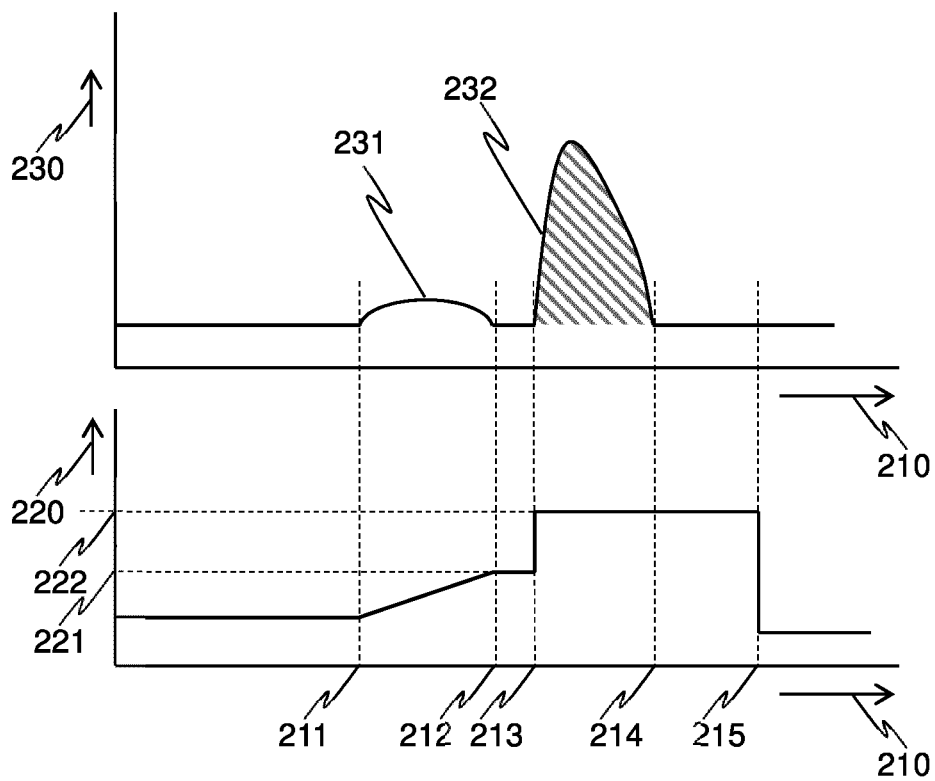
FIG. 2A depicts two plots, of a target clutch piston pressure and a rotational speed of a pump, both plotted on a time axis.
Figure 2B:
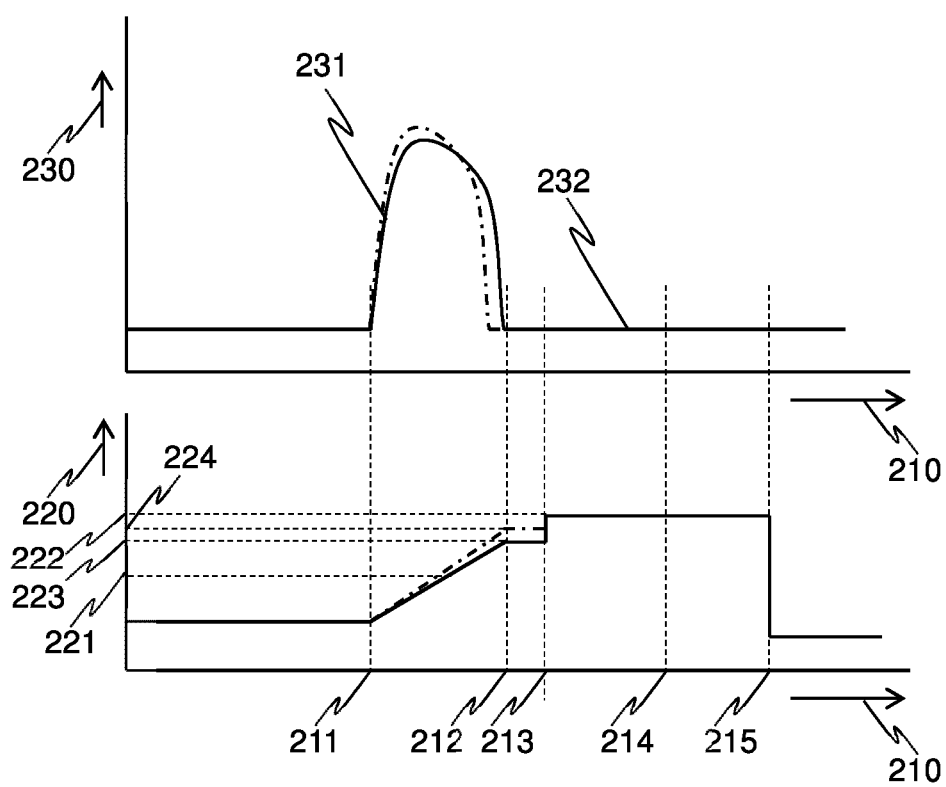
FIG. 2B depicts two plots, of a target clutch piston pressure and a rotational speed of a pump, both plotted on a time axis.

FIGS. 2A and 2B both depict two plots, of which the horizontal axis 210 represents the time, which may for example be measured in seconds. A first vertical axis 220 represents a target clutch piston pressure, and a second vertical axis 230 represents the rotational speed of the pump, which may be expressed in Rotations Per Minute (RPM). The target clutch piston pressure may act as a set-point for a controller controlling the clutch piston pressure. This pressure may be controlled by controlling the clutch valve 114. The rotational speed of the pump is an example of a parameter indicative for the filling of the clutch piston.

At a first point in time 211, the target clutch piston pressure is increased until at a second point in time 212 the target pressure corresponds to a lowest possible kiss point pressure 221 as a first test pressure value for the clutch piston. The target clutch piston pressure 220 is then kept substantially constant for a period of time, until at a third point in time 213, the target clutch piston pressure 220 is increased up to an upper target pressure 222.

Between the first point in time 211 and the second point in time 212, the pump 110 is rotated to transport fluid to the clutch valve 114 in a first pumping phase 231. Since the clutch will start below the volumetric kiss point and will hence not be completely filled, oil needs to flow into the clutch piston before the new clutch pressure is reached at the second point in time 212.

When the target clutch piston pressure is increased again at the third point in time 213, the clutch is filled up by the pump until the volumetric kiss point is reached at a fourth point in time 214. This filling up is visible as a second pumping phase 232. The surface area underneath the second pumping phase 232 represents the integrated value of the pump rotational speed 230 over time 210, and correlates to the amount of oil which has gone to the clutch during the filling up to kiss point, and is hence indicative for the filling of the clutch piston.

Finally, at a fifth point in time 215, the target clutch piston pressure is reset such that the target pressure can be increased to a second test level, as will be explained in conjunction with FIG. 2B. Reaching the fifth point in time 215 may mark the completion of a first test run with the first test pressure 221.

In FIG. 2B, the two plots of FIG. 2A are depicted, with the horizontal time axes 210, the first vertical axis 220 representing the target clutch piston pressure, and the second vertical axis 230 representing the rotational speed of the pump. However, now two different test target pressures are considered: a second test pressure 223 and a third test pressure 224. The second test pressure 223 is higher than the first test pressure 221, and is represented by the solid line, and the third test pressure 224 is higher than the second test pressure 223, and is represented by the dash-dotted line. Both the second test pressure 223 and the third test pressure 224 are in this example lower than the upper target pressure 222. Test pressures may in examples be lower than or equal to the upper target pressure 222.

Between the first point in time 211 and the second point in time 212, the target pressure 220 is ramped up to the second test pressure 223 in a second test run, and up to the third test pressure 224 in a third test run.

The change in target pressure may be a ramp, as shown for example in FIG. 2A between the first point in time 211 and the second point in time 212, a discrete change, as shown for example in FIG. 2A at the third point in time 213, any other transition, or any combination thereof.

For both the second test pressure 223 and the third test pressure 224, during the first pumping phase 231, more fluid is pumped by the pump due to the steeper ramp compared to the ramp for reaching the first test pressure 221. In particular, due to the higher target pressure, during the third test run with the third test pressure 224, the clutch piston reaches the volumetric kiss point prior to the second point in time 212.

When at the third point in time 213 the target pressure 220 is increased up to the upper target pressure 222 during the second run and the third run, the fluid displaced during the second pumping phase 232 is substantially zero. Hence, there is no or substantially no increase or decrease in the rotational speed 230 of the pump between the third point in time 213 and the fourth point in time 214 during the second run and the third run.

The fluid displaced during the second pumping phase 232 being substantially zero indicates that the test pressure before stepping up to the upper target pressure 222 was above the volumetric kiss point, since there was no or substantially no additional pump flow in the second pumping phase 232.

Figure 3:
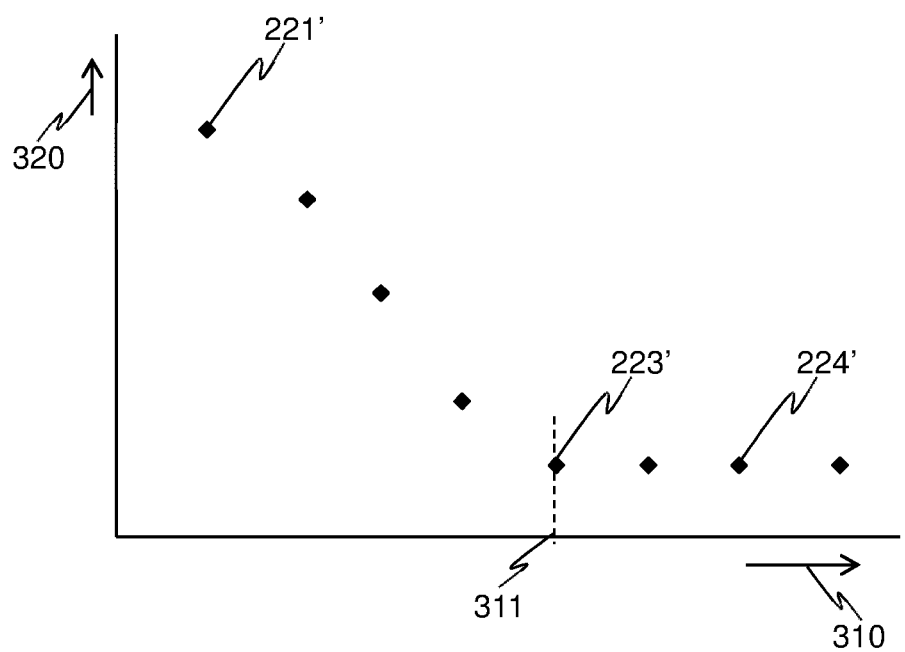
FIG. 3 depicts a plot in which a horizontal axis represents a test clutch piston pressure, and a vertical axis represents an integrated pump rotation speed.

FIG. 3 depicts a plot wherein the horizontal axis represents the test clutch piston pressure 310, and the vertical axis represents the integrated pump rotation speed 320 during the second pumping phase 232. In the plot of FIG. 3, the results from a total of eight test runs are shown as rectangles. In particular, a first rectangle 221' is indicated which is representative of the first test run with the first test pressure 221, a second rectangle 223' is indicated which is representative of the second test run with the second test pressure 223, and a third rectangle 224' is indicated which is representative of the third test run with the third test pressure 224.

Between the first test run and the second test run, three more test runs have been performed with test pressures between the first test pressure 221 and the second test pressure 223. Furthermore, a test run has been performed with a test pressure between the second test pressure 223 and the third test pressure 224, and a test run has been performed with a test pressure higher than the third test pressure 224, which can be deduced from FIG. 3.

As can be seen in FIG. 3, for this particular example, the integrated pump rotation speed 320 for the four test runs with the highest test pressure 310 is substantially equal and represents the lowest obtained integrated pump rotation speed 320 for these particular test runs. From this, it is found that the lowest test pressure to have this lowest integrated pump rotation speed 320 value is closest to the volumetric kiss point 311 for the clutch, which in this example corresponds to the second test pressure 223'.

In general, any number of test runs with different test pressures may be performed. For example, four, eight, twelve, or even more test runs may be performed. The tests runs may have been performed in any order, which order may be in order of increasing or decrease test pressure, and the different test pressures may be at equal intervals or not.

For the purpose of clarity and a concise description, features are described herein as part of the same or separate embodiments, however, it will be appreciated that the scope of the disclosure may include embodiments having combinations of all or some of the features described.

It may be understood that the embodiments shown have the same or similar components, apart from where they are described as being different. In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage. Many variants will be apparent to the person skilled in the art. All variants are understood to be comprised within the scope of the disclosure defined in the following claims.

The invention claimed is:

1. A method of determining a kisspoint of a clutch in a driveline of a vehicle comprising:
   a. increasing a target clutch pressure of a clutch piston up to a first predetermined test target pressure;
   b. increasing the target clutch pressure up to an upper target pressure and subsequently keeping the target clutch pressure stable for a predetermined time interval;
   c. monitoring a parameter indicative for the filling of the clutch piston during the predetermined time interval;
   d. repeating steps a., b., and c. for at least one further predetermined test target pressure; and
   e. determining the kisspoint based on the monitored parameter indicative for the filling of the clutch piston;
   wherein the parameter indicative for the filling of the clutch piston is a rotational speed of an electric motor of a pump providing fluid to the clutch piston.

2. The method according to claim 1, wherein the kisspoint is determined as the test target pressure at which the monitored parameter indicative for the filling of the clutch piston is indicative of no or substantially no filling of the clutch piston.

3. The method according to claim 1, wherein the determining the kisspoint further comprises integrating the parameter indicative for the filling of the clutch piston over at least part of the predetermined time interval for each test target pressure.

4. The method according to claim 1, wherein the first test target pressure is based on a previously determined kisspoint.

5. The method according to claim 1, further comprising upon determining that the monitored parameter indicative for the filling of the clutch piston is substantially equal for multiple test target pressures, then determining a volumetric kiss point as the lowest test target pressure of said multiple test target pressures.

6. The method according to claim 1, further comprising repeating steps a., b., and c. for further predetermined test target pressures until the kisspoint has been found.

7. The method according to claim 1, further comprising, prior to step a., determining whether other components of the vehicle require pressure from a pressure source used for increasing the target clutch pressure, and commencing with step a. only after determining that no other component requires pressure from said pressure source.

8. The method according to claim 1, further comprising:
   determining clutch life cycle data comprising data indicative of at least one of:
      a mileage of the vehicle;
      a number of clutch engagement actions; and
      an amount of clutch usage time; and
   starting with step a. at a moment in time based on the clutch life cycle data.

9. The method according to claim 8, further comprising adapting the kisspoint based on the clutch life cycle data.

10. The method according to claim 9, wherein the clutch life cycle data further comprises previously determined kisspoints for the clutch, and adapting the kisspoint is at least based on one of the previously determined kisspoints.

* * * * *